United States Patent
Werner et al.

(10) Patent No.: US 7,792,925 B1
(45) Date of Patent: Sep. 7, 2010

(54) ONE CLICK FULL-SCREEN VIDEO SYSTEM AND METHOD

(75) Inventors: Robert Douglas Werner, Sunnyvale, CA (US); Daniel Marusich, San Carlos, CA (US); Greg Gilman, Campbell, CA (US)

(73) Assignee: Apple Inc., Cupertino, CA (US)

( * ) Notice: Subject to any disclaimer, the term of this patent is extended or adjusted under 35 U.S.C. 154(b) by 2156 days.

(21) Appl. No.: 09/813,926

(22) Filed: Mar. 20, 2001

(51) Int. Cl.
*G06F 15/16* (2006.01)
*G06F 3/00* (2006.01)

(52) U.S. Cl. ..................... 709/219; 715/760

(58) Field of Classification Search ............ 709/203, 709/206, 219, 231; 715/730, 732, 760, 779
See application file for complete search history.

(56) References Cited

U.S. PATENT DOCUMENTS

| | | | | |
|---|---|---|---|---|
| 5,774,666 A * | 6/1998 | Portuesi | | 725/110 |
| 5,862,300 A * | 1/1999 | Yagasaki et al. | | 386/94 |
| 6,049,333 A * | 4/2000 | LaJoie et al. | | 715/718 |
| 6,389,467 B1 * | 5/2002 | Eyal | | 709/223 |
| 6,448,986 B1 * | 9/2002 | Smith | | 715/801 |
| 6,452,609 B1 * | 9/2002 | Katinsky et al. | | 715/716 |
| 6,513,069 B1 * | 1/2003 | Abato et al. | | 709/238 |
| 6,774,912 B1 * | 8/2004 | Ahmed et al. | | 345/629 |
| 6,836,791 B1 * | 12/2004 | Levi et al. | | 709/217 |
| 2002/0077900 A1 * | 6/2002 | Thompson et al. | | 705/14 |
| 2002/0144278 A1 * | 10/2002 | Pratts et al. | | 725/93 |
| 2004/0226042 A1 * | 11/2004 | Ellis | | 725/43 |

* cited by examiner

*Primary Examiner*—Aaron Strange
(74) *Attorney, Agent, or Firm*—Buchanan Ingersoll & Rooney PC (57) ABSTRACT

The present invention provides a method and system for playing full-screen video on a user computer. The method includes displaying in the user interface at the user computer a web page containing at least one link to electronic video file, selecting the link to request the video file, downloading the video file to user computer in response to the request, detecting by the user computer receipt of the video file, opening in the user interface to window of the video player in full-screen mode in response to the detecting, and reading the video file by the player to play the video in the window. A feature of the present invention is that the video player may not have its preferences preset by the user to open in any particular mode. The mode in which the video player opens will be determined by the downloaded video file.

127 Claims, 7 Drawing Sheets

ONE CLICK FULL-SCREEN VIDEO SYSTEM AND METHOD

BACKGROUND OF THE INVENTION

1. Field of the Invention

The present invention relates generally to the viewing in real-time of video content as it is being downloaded from the Internet and, more particularly, to the launching of a video player in full screen mode without user interaction to view the video after requesting its download.

2. Description of the Related Art

The viewing of video content on the Internet continually becomes more popular as the available bandwidth for content providers increases. For example, a news content provider may provide a video of a news story reported live from the location of the news event, similar to the reporting of televised news broadcasts. In such example, a user at a user computer connected to the Internet, through a web browser executing at the user computer, would access the web page of a news service provider, and then read such web page scanning for headlines and abstracts of news stories of particular interest. Typically, the headline of the story is set forth as a hypertext link. Selecting of the link in the user interface, such as by positioning a mouse pointer over the link and clicking the appropriate mouse button, would direct the user to an additional web page containing full text of the desired news story. The additional web page may contain a link to a video file to enable the user to view selectively the "live report," or be encoded to automatically download the video file to the user computer.

Upon the start of the download of the video file, the web browser would detect the receipt of the header of the video file. For the web browser to play to the video file, typically the web browser has been programmed with a helper or browser plug-in which reads the video file and displays the corresponding video in the browser window. Alternatively, the web browser plug-in launches a video player which plays the video in a separate window, usually overlaying the browser window.

In many such examples, similar to the one described above, the quality of the displayed video is of low resolution and is typically displayed in a "postage stamp" window. The low resolution quality is a result of the lack of bandwidth necessary to transmit a sufficient number of pixels to the user computer such that a larger image can be viewed in real-time.

The video file is typically encoded with separate audio and video tracks. For any given time segment of the video, the number of bytes required for the video track far exceeds the number of bytes of the audio track. Real time viewing requires that each track be decoded simultaneously as the video file is being contemporaneously downloaded and played such that the audio and video tracks remain synchronized to each other. Delays in transmission of the video file, caused either by insufficiency of bandwidth or network interruptions, may cause the player to pause playing of the video file until the next frame of data has been received or disconnect completely from the connection with the server from which the video file is being downloaded.

The effect of any such delays may be mitigated by buffering the downloaded electronic data prior to it being read by the video player. As electronic data on the video file is first downloaded, it is temporarily stored in a buffer. The reading of such data by the video player is delayed until a sufficient number of bytes of data have been temporarily stored in the buffer. Ideally, the time rate of reading of the bytes by the video player should not exceed the time rate of storing such bytes in the buffer. Accordingly, the buffer would always contain a number of bytes such that, should any bandwidth or interruption delay occur, there should always be a sufficient number of bytes for the video player and sufficient read without resulting in a pause or disconnect. However, depending on the display size of the video image, for the larger the display size the more bytes that are needed for each frame of data, there may be an insufficient number of bytes in the buffer to prevent such pause or disconnect.

With use of the highest connection speed dial-up modem to connect the user computer to the Internet, there is not much bandwidth available for displaying the video image in real-time much larger than the postage stamp image described above. Otherwise, should the user desire to view a much larger image, the user must download the video file first, and only after the complete video file has been downloaded may the user launched the player and play the video. However, digital subscriber line and cable modem service is becoming more readily available to users. The bandwidth increase of the digital subscriber line and cable modem service will allow for the transmission of more bytes for each frame of video data while enabling the video player to play the video contemporaneously with the download of the video data.

There have been attempts in the prior art to utilize the available bandwidth for the presentation of full-screen video. One such attempt does allow the user to view full-screen video during the download of such video. However, the video player must have its preferences changed by the user to display in full-screen mode the video being downloaded. This change of preferences must occur prior to the actual download in the video. Once the preferences have been changed, the video player cannot be used to view other videos which are not in full-screen mode. Another such attempt claimed that full-screen videos had been accomplished with a novel video player, however, the player window displayed a substantial amount of border adjacent to screen area in which the video is played.

Accordingly, it is desirable to provide a method and apparatus in which the user can download a video file, and view the corresponding video in real-time irrespective of the screen size which such video requires for viewing. It is also desirable to provide a method and apparatus which does not require the user to change preferences of the video player prior to downloading any such video.

SUMMARY OF THE INVENTION

According to the present invention, a method for playing full-screen video on a user computer includes displaying in the user interface at the user computer a web page containing at least one link to electronic video file, selecting the link to request the video file, downloading the video file to user computer in response to the request, detecting by the user computer receipt of the video file, opening in the user interface to window of the video player in full-screen mode in response to the detecting, and reading the video file by the player to play the video in the window.

A feature of the present invention is that the video player may not have its preferences preset by the user to open in any particular mode. The mode in which the video player opens will be determined by the downloaded video file.

These and other objects, advantages and features of the present invention will become readily apparent to those skilled in the art from a study of the following Description of the Exemplary Preferred Embodiments one in conjunction with the attached Drawing and appended Claims.

DESCRIPTION OF THE EXEMPLARY PREFERRED EMBODIMENTS

Figures 1, 2A, 2B:
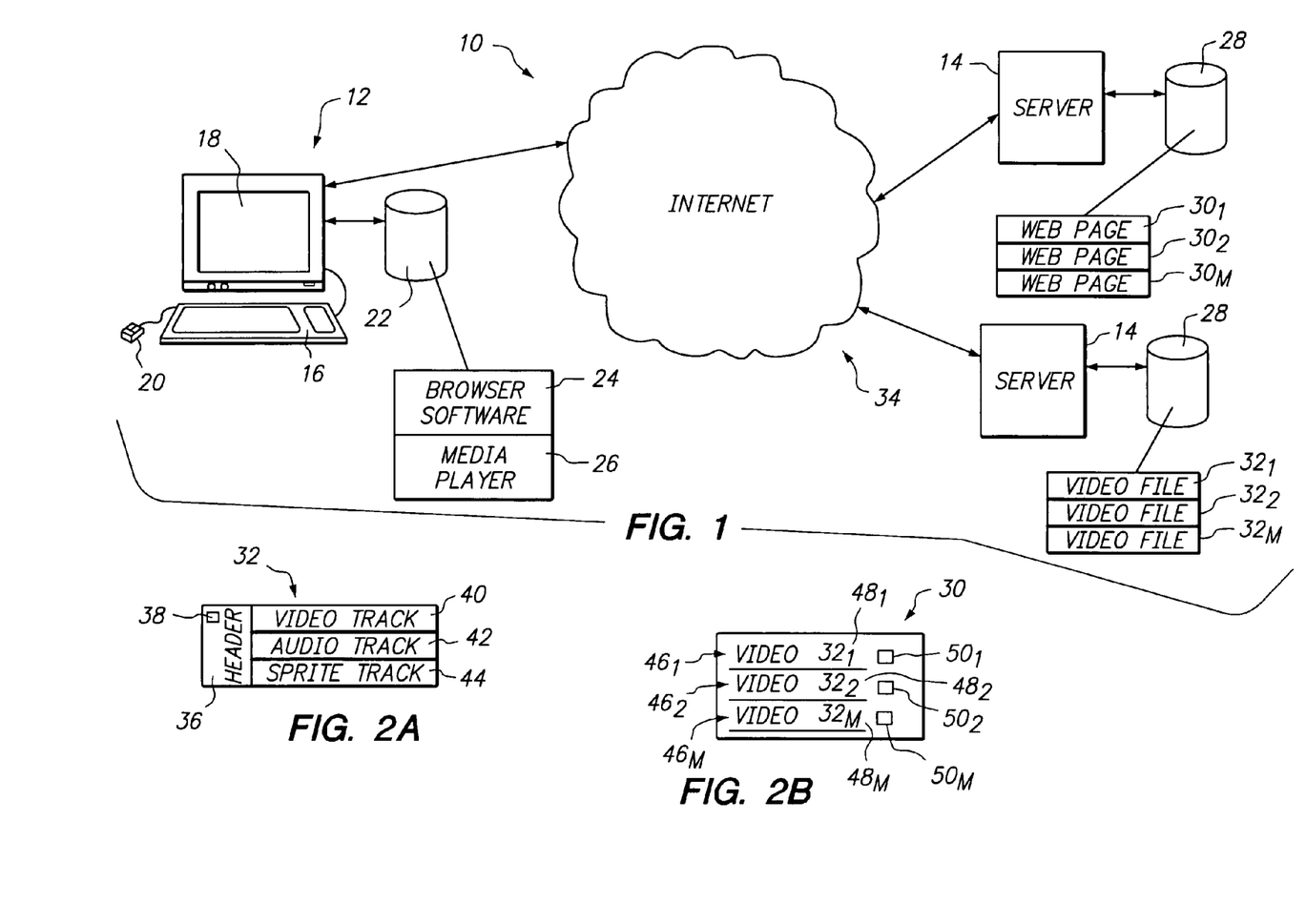
FIG. 1 is a diagram of the computer network in which the method to present invention may be practiced.
FIG. 2A is a block diagram useful to describe an exemplary video file of the present invention.
FIG. 2B is a block diagram useful to illustrate an exemplary web page.

Referring now to FIG. 1, there is shown a computer network 10 including a user computer 12 and a plurality of servers 14. The user computer 12 includes a user interface, the user interface being a combination of a keyboard 16, a monitor 18 and a mouse 20, each of which are used separately or in combination with each other to realize the user interface. The user computer 12 also includes a medium 22, such as a hard disk, in which programs are stored for execution on the user computer 12. Examples of such programs are browser software 24 and a media player 26. By way of example, the media player 26 may be the QuickTime player to provide the underlying functionality. Such functionality may include a full-screen mode and a sprite track methodology.

Each of the servers 14 may also include a medium 28, which may be a hard disk, in which server programs, web pages and downloadable video files may be stored. For example, the medium 28 of one of the servers 14 may include a plurality of web pages 30 1-n, and the medium 28 of the other one of the servers 14 may include a plurality of video files 32 1-m. The user computer 12 and each of the servers 14 are connectable to each other via the Internet, generally illustrated at 34. As is well known, the user computer 12 when programmed with the browser software 24 can have access to any of the web pages 30 via an appropriate servers 14 to display a copy of such web pages 30 when connected to such server 14 through the Internet 34.

With additional reference to FIG. 2A, each of the video files 32 has a header 36, the header 36 having a mode flag 38. In addition, each of the video files 32 also has a video track 40, an audio track 42 and a sprite track 44. As best seen in FIG. 2B, one of the web pages 30 may include a plurality of links 46 1-m each of the links 46 identifying the respective one of the video files 32. The links 46 may be in the form of a hypertext link 48 or an icon 50. The user at the user computer 12, when displaying the web page 30, selects a particular one of the links 46. In response to selection of the particular one of the links 46, the server 14 at which the respective one of the video files 32 is stored downloads such video files 32 to the user computer 12. The browser software 24 in the user computer 12 detects the header 36 of the video file 32. When the browser software 24 detects the header 36, it launches the video player 26. Upon being launched, the video player 26 is executable in the user computer 12 and opens in a mode indicated by the mode flag 38. This mode may be a full screen mode.

Figure 3A:
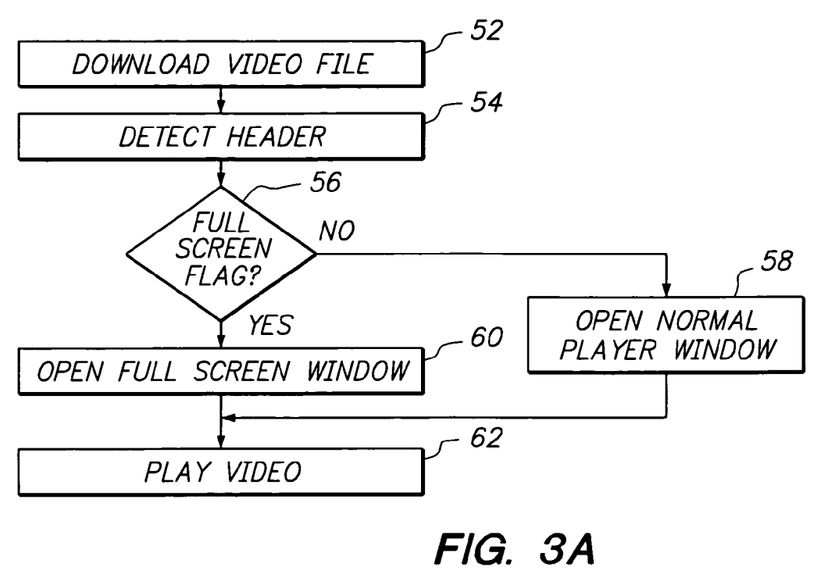
FIG. 3A is a flowchart useful to describe an exemplary method of generating a full-screen video.

Now referring to FIG. 3A, there is shown a flowchart useful to describe an exemplary method of generating a full-screen video. As indicated at 52, downloading of the video file 32 to the user computer 12 is made in response to a request, the receipt of the request being made by selecting the links 46 to request the associated video file 32 from displaying in the user interface the appropriate web page 30. In an embodiment, the download is automatic. For example, the selecting may include sending a request from the user computer to a server where the associated video file is located. Then, in response to such request, the associated video file may be automatically downloaded from said server to the user computer. One embodiment displays intermediate information provided by the sprite track 44 during the download process.

By way of example, the download may be a streaming download of digital audio and video that is structured and processed in a continuous flow. By way of example, said streaming download may be presented in a viewing mode while being downloaded. Another example is progressive downloading where the data is downloaded as a compressed file that is then decompressed as the data is being read by the media player 26. In such an example, a partial progressive download may initiate the viewing process as well as the functionality of said method. One embodiment displays intermediate information provided by the sprite track 44 during the presentation of said streaming download or partial progressive download.

As indicated at 54, detecting by the user computer of an initial receipt of the video file is made. An example of such detection is where a web browser detects the header information for the video file. The media player 26 is then launched by the web browser. At 56, a decision is made by detecting whether a flag 38 in the header 36 exists indicating that the player 26 should be open in full-screen mode. If no, the path is taken to 58 wherein the video player 26 opens in the normal window. In one embodiment, the opening automatically occurs absent any user interaction.

Otherwise if the flag 38 is present, the yes path is taken to 60 where in response to the detecting the flag the step of opening in the user interface the window of the video player 26 in full-screen mode is performed. In yet another embodiment, the opening occurs automatically, without any user interaction. At 62, the video is played by reading the video file by the player.

One embodiment includes the display of intermediate information during the download at 52 and the video play at 62. Such intermediate information may be included in the sprite track 44.

As is well known in the art, when the user at user computer 12 selects one of the links 46, the browser software 24 sends a request on the user computer 12 to the server 14 at which the video file 32 is locatable. In response to the request, the server 14 downloads the video file 32 to the user computer 12. By way of example, the download may be a streaming download wherein the audio and video file is processed in a continuous flow. As such, a portion of the download may be placed into a buffer while the information of the download may be buffered. The video player 26 may be playing video from the top of the buffer while newly downloaded data may be added to the bottom of the buffer. One embodiment displays intermediate information provided by the sprite track 44 during the presentation of said streaming download.

Another example may be a progressive download wherein a compressed file is decompressed by the video player 26 as said player is reading said file. A partial progressive download may initiate said method. The video player 26 may then read the video file contemporaneously with the video file 32 being downloaded. In one embodiment of the present invention, the video file 32 is compressed. The video player 26 then decompresses the video file contemporaneously with reading the video file 32. One embodiment displays intermediate information provided by the sprite track 44 during the presentation of said partial progressive download.

As described hereinabove, the video file 32 is encoded with the plurality of tracks, the video track 40, the audio track 42 and the sprite track 44. The sprite track 44 contains instructions readable by the video player 26. The video player 26 displays in the window of the video player information associated with the instructions. In one embodiment, the sprite track 44 may be downloaded first before any media data such as the audio track 42 and video track 40. Another embodiment downloads the video track 40, the audio track 42 and the sprite track 44 temporally concurrent wherein the sprite track 44 is acted upon first.

Link information, as well as other types of information, may be transmitted as data embedded within the sectors of DVD data itself. In such circumstances, the operating system acts upon said information and generates certain website links locally. An embodiment of the present invention includes such information on a sprite track 44 rather than within a sector of DVD data. The link may be then generated by the sprite track 44 as opposed to locally by an operating system. For example, one of such instructions included in the sprite track 44 could relate to a URL of a selected website. As the video player 26 executes the instruction in the sprite track 44, the video of the player will display a link to such selected website. Such link may be in the form of a hypertext link anchor to the URL of the website or may be an icon anchored to use such URL.

Another example of the instructions which may be included in the sprite track 44 may relate to the downloads status of the video file 32. In this case, the player 26 will display at least one status indicator in response to this instruction. By way of example, the progress bar may be generated by using the sprite track 44 wherein the sprite track 44 may provide information as to the progress of the download. This embodiment is distinguished from a progress bar generated locally at the user client 12 in that the sprite track 44 provides the progress instead of a calculation made locally. For example, the sprite track 44 may provide a custom progress bar, also defined as a status indicator. In one embodiment of the present invention, the status indicator may be continuously refreshable status bar. Alternatively, the status indicator may include continuously refreshable hash marks.

Another one of the instructions in the sprite track 44 may relate to additional video content. The video player 26 in response to the step of instruction would then display the additional video content. As will be described in greater detail hereinbelow, the additional video content may be contained within the sprite track 44 itself or be sourced from another one of the video files 32 1-*m*.

Figure 3B:
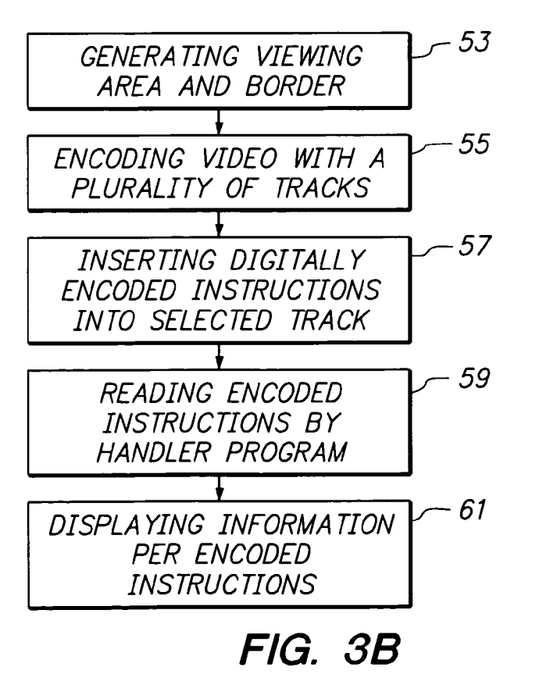
FIG. 3B is a flowchart useful to describe an exemplary method of generating a viewing screen area with an adjacent border.

Shown is FIG. 3B is a flowchart useful to describe an exemplary method of generating a viewing screen area with an adjacent border. As indicated at 53, the opening of the viewing area begins by generating the viewing area where the video is played and an adjacent border. The border may be adjacent to at least one edge of the viewing screen area. In generating said display, the video is encoded with a plurality of tracks, as indicated at 55. Inserted into the selected tracks are digitally encoded instructions, as indicated at 57. Next the digitally encoded instructions are read by a handler program, as indicated at 59. The handler program, by way of example, may be associated to the media player 26. Once read, the encoded information is displayed according to said instructions, as indicated at 61. The instructions may, for example, relate to a URL of a selected website and may display a link to said website within the adjacent border. The link may be a hypertext link or an icon anchored to the URL.

Another example of the instructions may contain information relating to the download status of the video. Such status may be displayed as a status indicator within the adjacent border. By way of example, the status indicator may be a continuously refreshable status bar or hash marks.

The instructions may also contain information relating to additional video content. In response to such instructions, said video content may be displayed in the viewing screen prior to playing the video. For example, specific tracks of the video may be buffered as it is being received at the user computer while playing the additional content from a selected track within the viewing screen.

Another example is inserting an instruction relating to additional video which displays a button for said additional video. The additional video is downloaded in response to the selecting of said button. The instructions may also relate to the display size of the video within the viewing area. In yet another example, the instructions may relate to the download management of the video.

Figure 4:
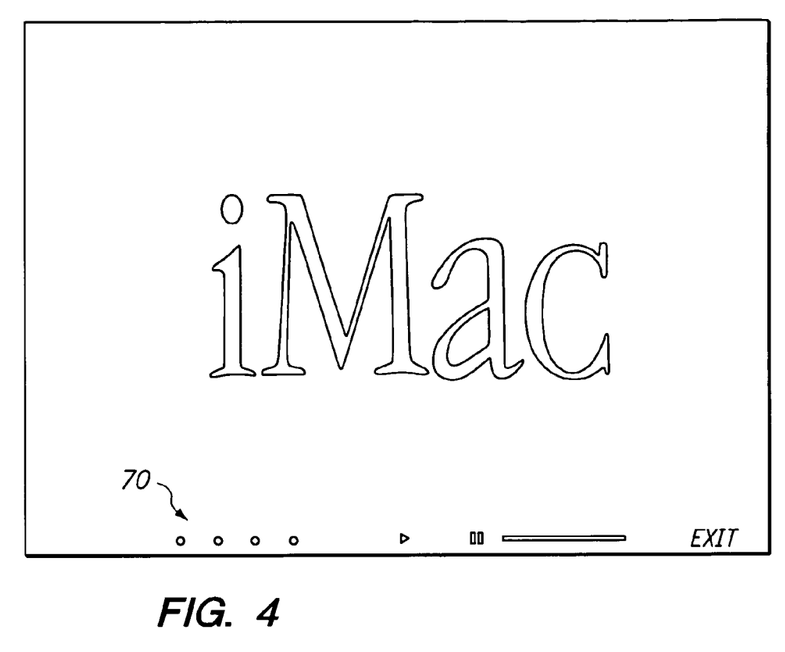
FIGS. 4-10 are screen shots and useful to illustrate operation of the present invention.

As best seen in FIG. 4, there is shown an example wherein the instructions in the sprite track display a plurality of buttons 70. Each of the buttons 70 correspond to a respective one of the video files 32. Selection of one of the buttons 70 will cause the corresponding one of the video files to be downloaded and played by the video player 26.

Figure 5:
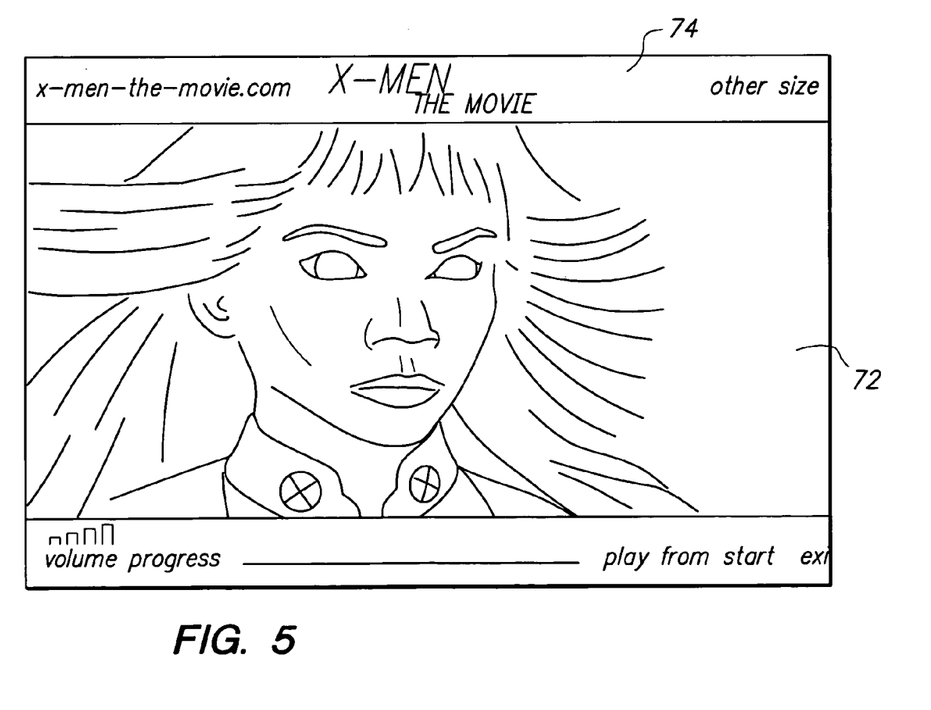
Figure 6:
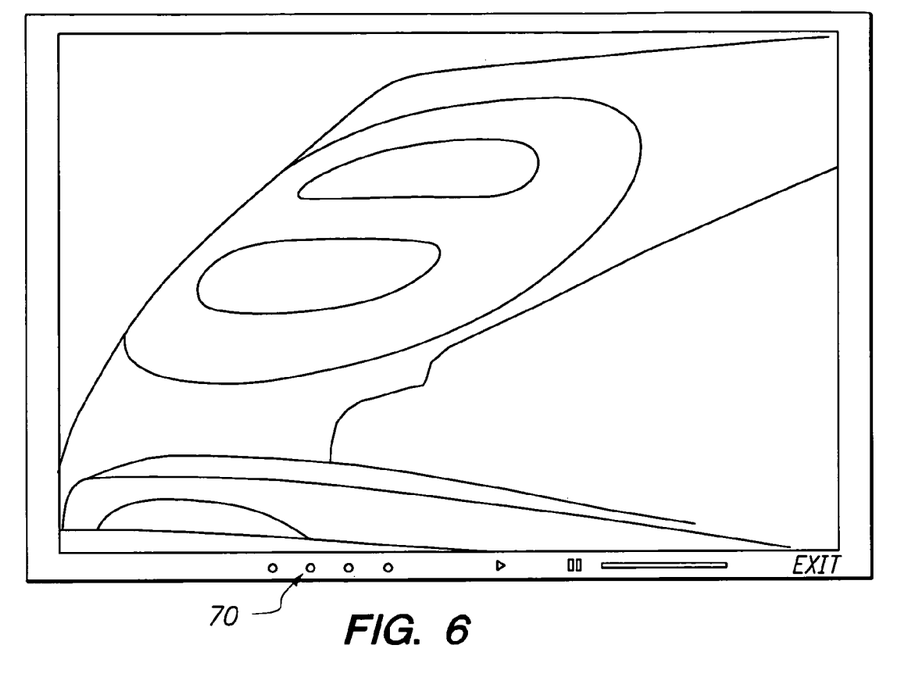
Figure 7:
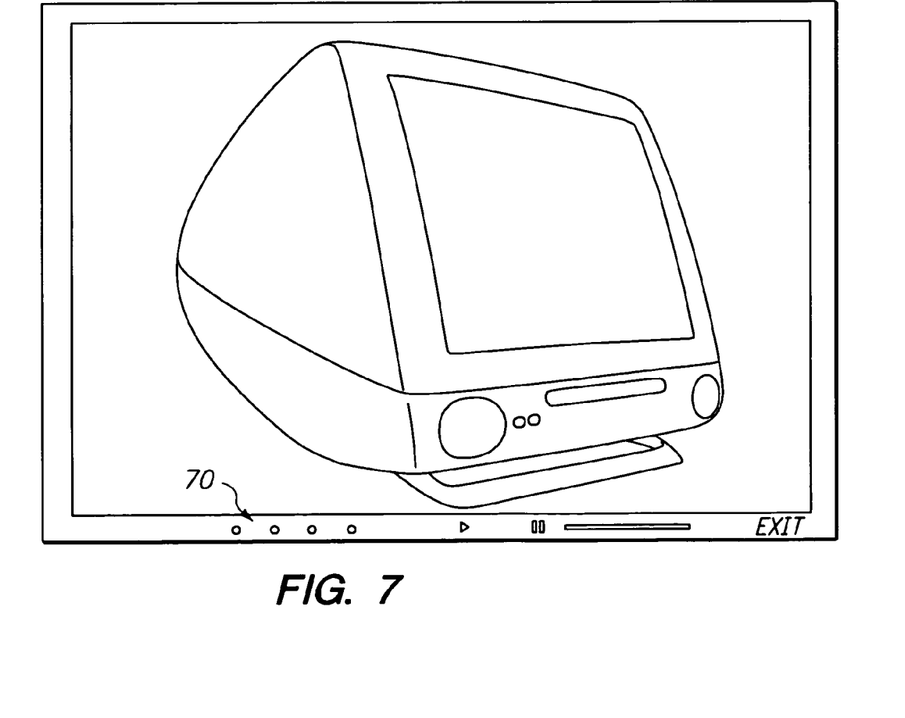
Figure 8:
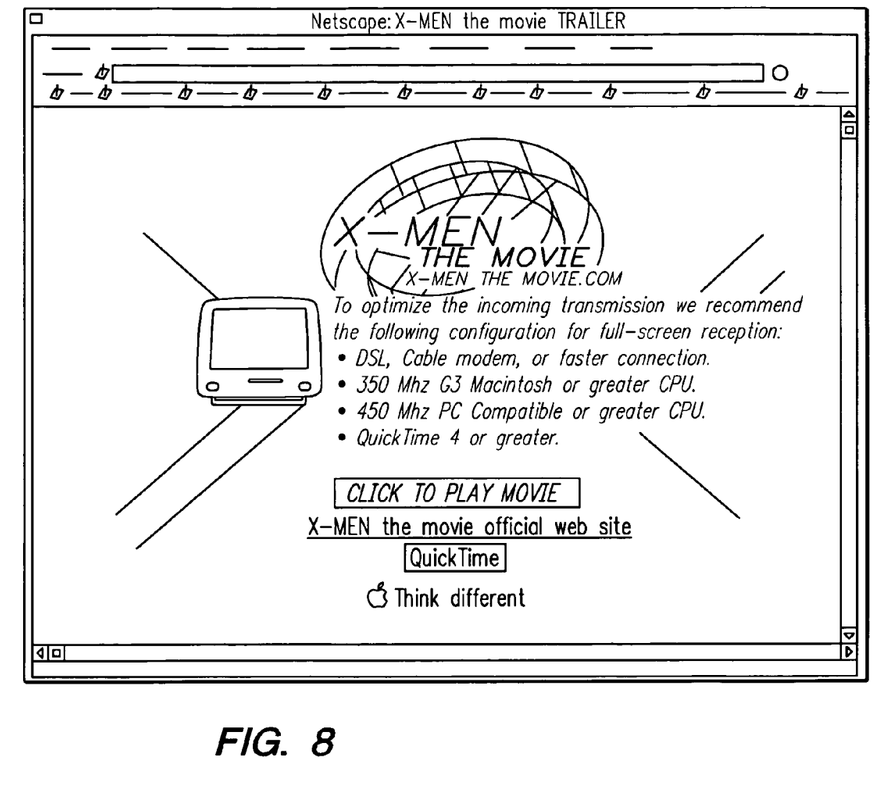
Figure 9:
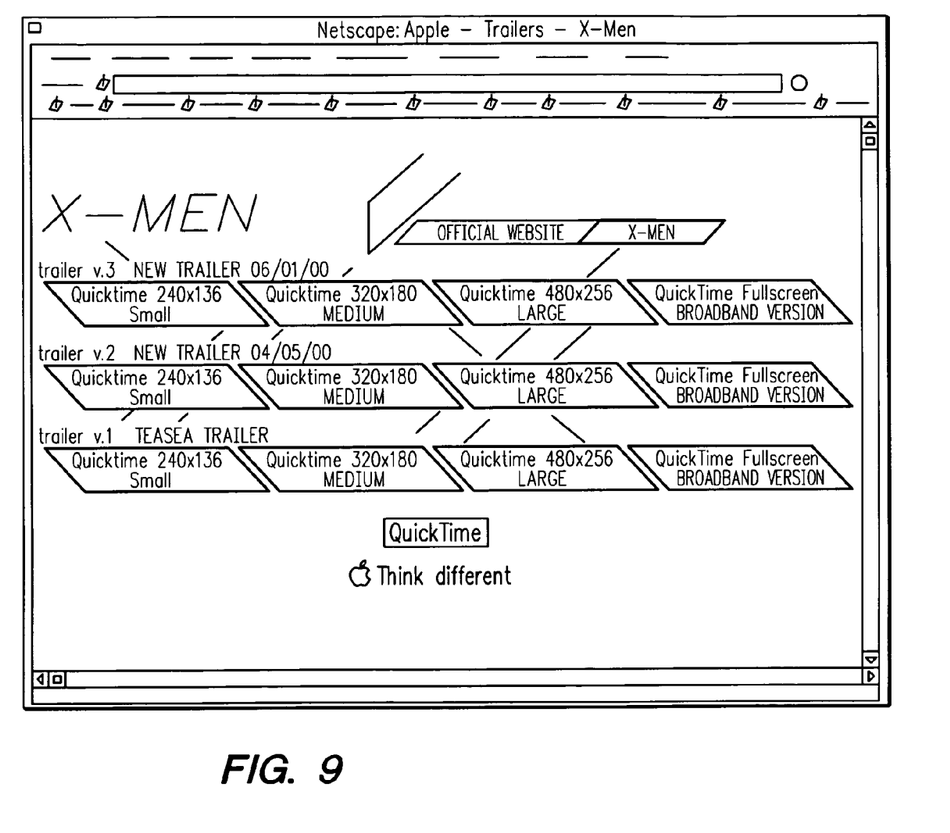
Figure 10:
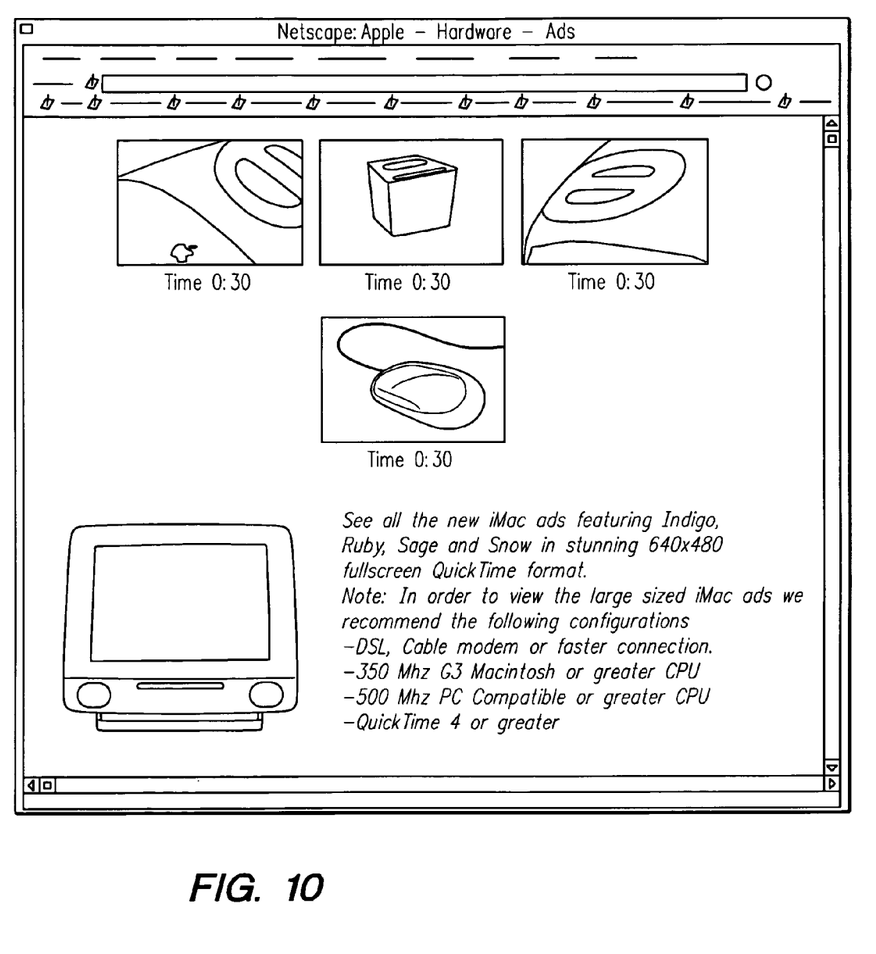

In addition to full screen video, as seen in FIGS. 5-7, the window may include a viewing screen area 72 and a border 74 adjacent at least one edge of the screen area 72, although the border may also be at top and bottom for letterbox video or surround the viewing screen area 72 for a television effect. The instructions in the sprite track may cause display of a control panel, and the status indicator. While the video file is downloading, the instructions in the sprite track may cause an additional video to be viewed. Such additional video can be highly compressed and contained in the sprite track, and not use very much bandwidth. The additional video plays while the desired downloading video is being buffered.

While there has been described what are believed to be exemplary embodiments of the present invention, those skilled in the art will recognize that other and further changes and modifications may be made thereto without departing from the scope of the invention which is defined by the appended claims, and it is intended to claim all such changes and modifications as fall within the true scope of the invention.

The invention claimed is:

1. A method for playing full screen video on a user computer comprising:

displaying in a user interface at said user computer a web page containing at least one link to an electronic video file;

selecting said link to request said video file;

downloading said video file to said user computer in response to said request;

detecting by said user computer an initial receipt of said video file, wherein said detecting includes determining a display mode of the video file;

opening in said user interface a window of a video player in full screen mode in response to said detecting;

reading said video file by said player to play said video in said window;

encoding said video file with a header and a plurality of tracks; and inserting plural instructions into a selected one of said tracks;

wherein said plural instructions are readable by said player so that said player displays information in response to the instructions, wherein said inserting includes inserting a first instruction relating to additional video content, and displaying information in response to said first instruction which includes playing said additional video content within a viewing screen of said player prior to playing said video.

2. The method as set forth in claim 1 wherein said detecting includes:

detecting, by a web browser, header information for said video file; and launching, by said web browser, said player.

3. The method as set forth in claim 1 wherein said opening includes:

detecting, by said player, a flag in header information for said video file; and opening said window in a mode indicated by said flag.

4. The method as set forth in claim 1 wherein said opening occurs absent user interaction.

5. The method as set forth in claim 1 wherein said selecting includes:

sending a request from said user computer to a server at which said video file is locatable; and in response to said request, downloading said video file from said server to said user computer.

6. The method as set forth in claim 1 wherein said reading occurs contemporaneously with said downloading.

7. The method as set forth in claim 6 further comprising:

compressing said video file prior to said downloading; and decompressing said video file contemporaneously with said reading.

8. The method as set forth in claim 1 further comprising;

reading said instructions by said player; and displaying in said window information associated with said instructions.

9. The method as set forth in claim 8 wherein said inserting includes inserting a second instruction relating to at least one additional video, and displaying information in response to said second instruction which includes displaying a button for said additional video.

10. The method as set forth in claim 9 further comprising downloading an additional video file corresponding to said additional video to said user computer in response to selecting said button.

11. The method as set forth in claim 10 wherein said inserting includes inserting a third instruction relating to said video, and displaying information in response to said third instruction relating to said video which includes displaying a button for said video.

12. The method as set forth in claim 11 wherein said button for said video and said button for said additional video each uniquely identify a respective one of said video and said additional video.

13. The method as set forth in claim 11 wherein selecting any of said buttons plays said respective video for said selected button.

14. The method as set forth in claim 1 wherein said inserting includes inserting a second instruction relating to a URL of a selected website, and displaying information in response to said second instruction which includes displaying a link to said website.

15. The method as set forth in claim 14 wherein said displaying said link to said website includes displaying a hypertext link anchored to said URL.

16. The method as set forth in claim 14 wherein said displaying said link to said website includes displaying an icon anchored to said URL.

17. The method as set forth in claim 1 wherein said displaying information in response to the instructions includes displaying a status indicator which includes displaying a continuously refreshable status bar.

18. The method as set forth in claim 1 wherein said displaying information in response to the instructions includes displaying a status indicator which includes displaying continuously refreshable hash marks.

19. The method as set forth in claim 1 wherein said inserting includes inserting a second instruction relating to additional video content, and displaying information in response to said second instruction which includes displaying said additional content.

20. The method as set forth in claim 1 wherein said opening includes generating in said window a viewing screen area and a border adjacent at least one edge of said viewing screen, said video being played in said viewing screen.

21. The method as set forth in claim 20 further comprising;

inserting a plurality of digitally encoded instructions into a selected one of said tracks;

reading said instructions by a handler program associated with said player; and displaying selectively in an area of said viewing screen area and a border adjacent to at least one edge of said viewing screen area said information associated with said instructions.

22. The method as set forth in claim 21 wherein said inserting includes inserting a second instruction relating to a URL of a selected website, and displaying information in response to said second instruction which includes displaying a link to said website within said border.

23. The method as set forth in claim 22 wherein said displaying said link to said website includes displaying a hypertext link anchored to said URL.

24. The method as set forth in claim 22 wherein said displaying said link to said website includes displaying an icon anchored to said URL.

25. The method as set forth in claim 21 wherein said inserting includes inserting a second Instruction relating to a download status of said video, and displaying information in response to said second instruction which includes displaying at least one status indicator within said border.

26. The method as set forth in claim 25 wherein said displaying information in response to the instructions includes displaying a status indicator which includes displaying a continuously refreshable status bar.

27. The method as set forth in claim 25 wherein said displaying information in response to the instructions includes displaying a status indicator which includes displaying continuously refreshable hash marks.

28. The method as set forth in claim 1 further comprising buffering other ones of said tracks of said video file as it is being received at said user computer while playing said additional content from said selected one of said tracks within said viewing screen.

29. The method as set forth in claim 1 further comprising:

reading said plural instructions through a handler program associated with said player; and monitoring, selectively, a download of said video file in accordance with said plural instructions.

30. The method as set forth in claim 29 wherein said instructions relate to the display size of said video within said window.

31. The method as set forth in claim 29 wherein said instructions relate to download management of said video file.

32. An apparatus in a computer network having a server, at least one web page accessible through said server and a user computer programmed with browser software to display a copy of said web page when connected to said server, the apparatus comprising:
 a video file having a header, said header having a mode flag, said video file being identified by a link in said web page, said server downloading said video file to said user computer in response to selection of said link, said browser software detecting said header; and
 a video player executable in said user computer, said player being launched in response to said browser detecting said header to receive said video file during downloading thereof, said video player opening in a mode indicated by said mode flag,
 wherein said video file is encoded with a plurality of tracks, a selected one of said tracks containing instructions readable by said player,
 wherein one of said instructions is a first instruction relating to additional video content, said player in response to said first instruction displaying said additional content, and
 wherein said player plays said additional video content within said viewing screen area prior to playing said video.

33. The apparatus as set forth in claim 32 wherein said mode is a full screen mode.

34. The apparatus as set forth in claim 32 wherein said video player opening occurs absent user interaction.

35. The apparatus as set forth in claim 32 wherein said browser software sends a request from said user computer to said server at which said video file is locatable, and in response to said request, said server downloads said video file to said user computer.

36. The apparatus as set forth in claim 32 wherein said video player reads said video file contemporaneously with said video file being downloaded.

37. The apparatus as set forth in claim 36 wherein when said video file is compressed, said player decompressing said video file contemporaneously with reading said file.

38. The apparatus as set forth in claim 32 wherein said link is an icon anchored to said URL.

39. The apparatus as set forth in claim 32 wherein said player displays a status indicator that includes a continuously refreshable status bar.

40. The apparatus as set forth in claim 32 wherein said player displays a status indicator that includes continuously refreshable hash marks.

41. The apparatus as set forth in claim 32 wherein said player displays a window that includes a viewing screen area and a border adjacent at least one edge of said viewing screen area, said video being played in said viewing screen area.

42. The apparatus as set forth in claim 41 wherein said instructions are digitally encoded, said player having a handler program to read said instructions said player displaying selectively in said viewing screen area and a border adjacent at least one edge of said viewing screen area, said information associated with said instructions.

43. The apparatus as set forth in claim 42 wherein one of said instructions is a second instruction relating to a URL of a selected website, said player in response to said second instruction displaying a link to said website within said border.

44. The apparatus as set forth in claim 43 wherein said link is a hypertext link anchored to said URL.

45. The apparatus as set forth in claim 43 wherein said link is an icon anchored to said URL.

46. The apparatus as set forth in claim 42 wherein said one of said instructions is a second instruction relating to a download status of said video file, said player in response to said second instruction displaying at least one status indicator within said border.

47. The apparatus as set forth in claim 46 wherein said status indicator is a continuously refreshable status bar.

48. The apparatus as set forth in claim 46 wherein said status indicator is continuously refreshable hash marks.

49. The apparatus as set forth in claim 42 wherein said one of said instructions is a second instruction relating to additional video content, and said player in response to said second instruction playing said additional video content within said viewing screen area.

50. The apparatus as set forth in claim 32 wherein said player buffers other ones of said tracks of said video file as it is being received at said user computer while playing said additional content from said selected one of said tracks within said viewing screen.

51. The apparatus as set forth in claim 32 wherein said one of said instructions is a second instruction relating to at least one additional video, said player in response to said second instruction displaying a button for said additional video.

52. The apparatus as set forth in claim 51 wherein an additional video file corresponding to said additional video is downloaded to said user computer in response to selecting said button.

53. The apparatus as set forth in claim 52 wherein one of said instructions is a third instruction relating to said video, said player in response to said third instruction relating to said video displaying a button for said video.

54. The apparatus as set forth in claim 53 wherein said button for said video and said button for said additional video each uniquely identify a respective one of said video and said additional video.

55. The apparatus as set forth in claim 53 wherein selecting any of said buttons plays said respective video for said selected button.

56. The apparatus as set forth in claim 32 wherein said selected one of said tracks having instructions readable by a handler program associated with said player, said handler program monitoring selectively download of said video file in accordance with said instructions.

57. The apparatus as set forth in claim 56 wherein said instructions relate to a display size of said video within said window.

58. The apparatus as set forth in claim 56 wherein said instructions relate to download management of said video file.

59. The apparatus as set forth in claim 32,
 wherein one of said instructions is a second instruction relating to a download status of said video file, said player displaying at least one status indicator in response to said one of said instructions.

60. The apparatus as set forth in claim 59 wherein said player displaying in a window of said viewing screen area, information associated with said instructions.

61. The apparatus as set forth in claim 60 wherein one of said instructions is a second instruction relating to a URL of a selected website, said player displaying a link to said website in response to said second instruction.

62. The apparatus as set forth in claim 61 wherein said link is a hypertext link anchored to said URL.

63. An apparatus for playing full screen video on a user computer comprising:
- means for displaying in a user interface at said user computer a web page containing at least one link to an electronic video file;
- means for selecting said link to request said video file;
- means for downloading said video file to said user computer in response to said request;
- means for detecting by said user computer an initial receipt of said video file and determining a display mode of the video file;
- means for opening in said user interface a window of a video player in full screen mode in response to said detecting; and
- means for reading said video file by said player to play said video in said window,
- wherein said video file is encoded with a plurality of tracks, one of said tracks having instructions,
- wherein one of said instructions is a first instruction relating to additional video content, said player in response to said first instruction displaying said additional video content, and
- wherein said player plays said additional video content within a viewing screen area prior to playing said video.

64. The apparatus as set forth in claim 63 wherein said detecting means includes:
- a web browser to detect header information for said video file, said player being launched by said web browser.

65. The apparatus as set forth in claim 63 wherein said opening means occurs absent user interaction.

66. The apparatus as set forth in claim 64 wherein said opening means includes:
- a flag in header information for said video file detectable by said player, said player opening said window in the display mode indicated by said flag.

67. The apparatus as set forth in claim 63 wherein said selecting means includes a web browser to send a request from said user computer to a server at which said video file is locatable, in response to said request, said video file being downloaded from said server to said user computer.

68. The apparatus as set forth in claim 63 wherein said reading means reads said video file contemporaneously with said video file being downloaded.

69. The apparatus as set forth in claim 68 wherein when said video file is compressed prior to said video file being downloaded, said player decompressing said video file contemporaneously with reading said video file.

70. The apparatus as set forth in claim 63 wherein one of said instructions is a second instruction relating to a URL of a selected website, said player in response to said one of said second instructions displaying a link to said website.

71. The apparatus as set forth in claim 63 wherein said link to said website is a hypertext link anchored to said URL.

72. The apparatus as set forth in claim 63 wherein said link to said website is an icon anchored to said URL.

73. The apparatus as set forth in claim 63 one of said instructions is a second instruction relating to a download status of said video file, said player in response to said second instruction displaying at least one status indicator, wherein said status indicator is a continuously refreshable status bar.

74. The apparatus as set forth in claim 63 one of said instructions is a second instruction relating to a download status of said video file, said player in response to said second instruction displaying at least one status indicator, wherein said status indicator includes continuously refreshable hash marks.

75. The apparatus as set forth in claim 63 wherein said window includes a viewing screen area and a border adjacent at least one edge of said viewing screen area, said video being played in said viewing screen area.

76. The apparatus as set forth in claim 75 wherein one of said tracks includes a plurality of instructions that are digitally encoded, said player having a handler program to read said instructions to display selectively in said viewing screen area and said border adjacent at least one edge of said viewing, screen area said information associated with said instructions.

77. The apparatus as set forth in claim 76 wherein one of said instructions is a second instruction relating to a URL of a selected website, said player in response to said second instruction displaying a link to said website within said border.

78. The apparatus as set forth in claim 77 wherein said link to said website is a hypertext link anchored to said URL.

79. The apparatus as set forth in claim 77 wherein said link to said website is an icon anchored to said URL.

80. The apparatus as set forth in claim 76 wherein one of said instructions is a second instruction relating to a download status of said video, said player in response to said second instruction displaying at least one status indicator within said border.

81. The apparatus as set forth in claim 80 wherein said status indicator is a continuously refreshable status bar.

82. The apparatus as set forth in claim 80 wherein said status indicator includes continuously refreshable hash marks.

83. The apparatus as set forth in claim 63 wherein said player buffers other ones of said tracks of said video file as it is being received at said user computer while playing said additional content from said selected one of said tracks within said viewing screen area.

84. The apparatus as set forth in claim 63 wherein one of said instructions is a second instruction relating to at least one additional video, and displaying information in response to said second instruction includes displaying a button for said additional video.

85. The apparatus as set forth in claim 84 wherein an additional video file corresponding to said at least one additional video is downloaded to said user computer in response to selecting said button.

86. The apparatus as set forth in claim 85 wherein one of said instructions is a third instruction relating to said video, and displaying information in response to said third instruction includes relating to said video displaying a button for said video.

87. The apparatus as set forth in claim 86 wherein said button for said video and said button for said additional video each uniquely identify a respective one of said video and said additional video.

88. The apparatus as set forth in claim 86 wherein selecting any of said buttons plays said respective video for said selected button.

89. The apparatus as set forth in claim 63 wherein, said player including a handler program to read said instructions, said handler program monitoring selectively download of said video file in accordance with said instructions.

90. The apparatus as set forth in claim 89 wherein said instructions relate to a display size of said video within said window.

91. The apparatus as set forth in claim 89 wherein said instructions relate to download management of said video file.

92. The apparatus as set forth in claim 63,
wherein one of said instructions is a second instruction relating to a download status of said video file, said player in response to said second instruction displaying at least one status indicator.

93. The apparatus as set forth in claim 92, said player reading said instructions to display in said window information associated with said instructions.

94. A computer readable medium containing programming which when executed performs the following procedures comprising:
displaying in a user interface at said user computer a web page containing at least one link to an electronic video file;
selecting said link to request said video file;
downloading said video file to said user computer in response to said request;
detecting by said user computer an initial receipt of said video file, wherein said detecting includes determining a display mode of the video file;
opening in said user interface, a window of a video player in full screen mode in response to said detecting;
reading said video file by said player to play a video in said window,
wherein said video file is encoded with a plurality of tracks, one of said tracks having instructions,
wherein one of said instructions is a first instruction relating to additional video content, said player in response to said first instruction displaying said additional video content, and
wherein said player plays said additional video content within a viewing screen area at said window prior to playing said video.

95. The medium as set forth in claim 94 wherein said detecting procedure includes:
detecting by a web browser header information for said video file; and
launching said player through said web browser.

96. The medium as set forth in claim 95 wherein said opening procedure includes:
detecting by said player a flag in said header information for said video file; and
opening said window in the display mode indicated by said flag.

97. The medium as set forth in claim 94 wherein said opening procedure occurs absent user interaction.

98. The medium as set forth in claim 94 wherein said selecting procedure includes:
sending a request from said user computer to a server at which said video file is locatable; and
in response to said request, downloading said video file from said server to said user computer.

99. The medium as set forth in claim 94 wherein said reading occurs contemporaneously with said downloading.

100. The medium as set forth in claim 99 further comprising procedures of:
compressing said video file prior to said downloading; and
decompressing said video file contemporaneously with said reading.

101. The medium as set forth in claim 94 further comprising procedures of:
reading said instructions by said player; and
displaying in said window information associated with said instructions.

102. The medium as set forth in claim 101 wherein said inserting procedure includes inserting a second instruction relating to a URL of a selected website, said displaying in response to said second instruction includes displaying a link to said website.

103. The medium as set forth in claim 102 wherein said displaying said link to said website includes displaying a hypertext link anchored to said URL.

104. The medium as set forth in claim 102 wherein said displaying said link to said website includes displaying an icon anchored to said URL.

105. The medium as set forth in claim 92 wherein displaying said status indicator includes displaying a continuously refreshable status bar.

106. The medium as set forth in claim 94 wherein displaying said status indicator includes displaying continuously refreshable hash marks.

107. The medium as set forth in claim 94 wherein said inserting procedure includes inserting a second instruction relating to additional video content, and a displaying procedure in response to said second instruction includes displaying said additional content.

108. The medium as set forth in claim 94 wherein said opening procedure includes generating in said window a viewing screen area and a border adjacent at least one edge of said viewing screen area, said video being played in said viewing screen area.

109. The medium as set forth in claim 108, wherein said instructions are digitally encoded, the medium further comprising procedures of:
reading said instructions by a handler program associated with said player; and
displaying selectively in said viewing screen area and said border adjacent at least one edge of said viewing screen area said information associated with said instructions.

110. The medium as set forth in claim 109 wherein said inserting procedure includes inserting a second instruction relating to a URL of a selected website, and a displaying procedure in response to said second instruction includes displaying a link to said website within said border.

111. The medium as set forth in claim 110 wherein displaying said link to said website includes displaying a hypertext link anchored to said URL.

112. The medium as set forth in claim 110 wherein displaying said link to said website includes displaying an icon anchored to said URL.

113. The medium as set forth in claim 107 wherein said inserting procedure includes inserting a second instruction relating to a download status of said video, and a displaying procedure in response to said second instruction includes displaying at least one status indicator within said border.

114. The medium as set forth in claim 113 wherein displaying said status indicator includes displaying a continuously refreshable status bar.

115. The medium as set forth in claim 113 wherein displaying said status indicator includes displaying continuously refreshable hash marks.

116. The medium as set forth in claim 109 wherein said inserting procedure includes inserting a second instruction relating to additional video content, and a displaying procedure in response to said second instruction includes playing said additional video content within said viewing screen.

117. The medium as set forth in claim 94 further comprising a procedure of buffering other ones of said tracks of said video file as it is being received at said user computer while playing said additional content from said selected one of said tracks within said viewing screen.

118. The medium as set forth in claim 110 wherein said inserting procedure includes inserting a third instruction relating to at least one additional video, and a displaying procedure in response to said third instruction includes displaying a button for said additional video.

119. The medium as set forth in claim 118 further comprising a procedure of downloading an additional video file corresponding to said additional video to said user computer in response to selecting said button.

120. The medium as set forth in claim 119 wherein said inserting procedure includes inserting a fourth instruction relating to said video, and a displaying procedure in response to said fourth instruction relating to said video includes displaying a button for said video.

121. The medium as set forth in claim 120 wherein said button for said video and said button for said additional video each uniquely identify a respective one of said video and said additional video.

122. The medium as set forth in claim 120 wherein selecting any of said buttons plays said respective video for said selected button.

123. The medium as set forth in claim 94 further comprising procedures of:
  reading said instructions by a handler program associated with said player; and
  monitoring selectively a download of said video file in accordance with said instructions.

124. The medium as set forth in claim 123 wherein said instructions relate to a display size of said video within said window.

125. The medium as set forth in claim 123 wherein said instructions relate to download management of said video file.

126. The medium as set forth in claim 94, further comprising:
  wherein one of said instructions is a second instruction relating to a download status of said video, said player in response to said second instruction displaying at least one status indicator.

127. An apparatus in a computer network having a server, at least one web page accessible through said server and a user computer programmed with browser software to display a copy of said at least one web page when connected to said server, the apparatus comprising:
  a video file having a header and plural tracks, each of said tracks having instructions that are readable so that information in response to the instructions is displayed, said header having a mode flag, said video file being identified by a link in said web page, said web server downloading said video file to said user computer in response to selection of said link, said browser software detecting said header, wherein a first instruction of said instructions relates to additional video content; and
  a video player executable in said user computer, said player being launched in response to said browser and detecting said header to receive said video file during downloading thereof, said video player opening in a mode indicated by said mode flag, wherein said video player plays said additional video content within a viewing area prior to playing said video.

* * * * *

UNITED STATES PATENT AND TRADEMARK OFFICE
CERTIFICATE OF CORRECTION

| | | |
|---|---|---|
| PATENT NO. | : 7,792,925 B1 | Page 1 of 1 |
| APPLICATION NO. | : 09/813926 | |
| DATED | : September 7, 2010 | |
| INVENTOR(S) | : Robert Douglas Werner et al. | |

It is certified that error appears in the above-identified patent and that said Letters Patent is hereby corrected as shown below:

In column 2, line 40, delete "real-time" and insert -- real-time, --, therefor.

In column 8, line 28, in claim 21, after "area" delete "said".

In column 8, line 43, in claim 25, delete "Instruction" and insert -- instruction --, therefor.

In column 12, line 9-10, in claim 76, delete "viewing," and insert -- viewing --, therefor.

In column 14, line 10, in claim 105, delete "92" and insert -- 94 --, therefor.

In column 14, line 45, in claim 113, delete "107" and insert -- 109 --, therefor.

Signed and Sealed this
Twenty-second Day of November, 2011

David J. Kappos
*Director of the United States Patent and Trademark Office*